US012605685B2

(12) United States Patent
Clarkson et al.

(10) Patent No.: US 12,605,685 B2
(45) Date of Patent: Apr. 21, 2026

(54) COMPACTING ELEMENTS FOR REDUCING FLUIDISATION IN CATALYST CARRIER FOR TUBULAR REACTORS AND ASSOCIATED METHODS

(71) Applicant: JOHNSON MATTHEY DAVY TECHNOLOGIES LIMITED, London (GB)

(72) Inventors: Jay Simon Clarkson, Stockton-on-Tees (GB); Henry Arthur Claxton, London (GB); Benjamin Geoffrey Mallam, Stockton-on-Tees (GB)

(73) Assignee: Johnson Matthey Davy Technologies Limited, London (GB)

( * ) Notice: Subject to any disclaimer, the term of this patent is extended or adjusted under 35 U.S.C. 154(b) by 405 days.

(21) Appl. No.: 18/040,550

(22) PCT Filed: Sep. 24, 2021

(86) PCT No.: PCT/GB2021/052492
§ 371 (c)(1),
(2) Date: Feb. 3, 2023

(87) PCT Pub. No.: WO2022/064213
PCT Pub. Date: Mar. 31, 2022

(65) Prior Publication Data
US 2023/0294056 A1 Sep. 21, 2023

(30) Foreign Application Priority Data

Sep. 25, 2020 (GB) ...................................... 2015185

(51) Int. Cl.
*B01J 8/06* (2006.01)
*B01J 8/00* (2006.01)

(52) U.S. Cl.
CPC ................. *B01J 8/06* (2013.01); *B01J 8/002* (2013.01); *B01J 2208/00814* (2013.01); *B01J 2208/00884* (2013.01)

(58) Field of Classification Search
CPC ... B01J 8/06; B01J 8/0015; B01J 8/008; B01J 2208/00814; B01J 2208/00884
See application file for complete search history.

(56) References Cited

U.S. PATENT DOCUMENTS

| | | | |
|---|---|---|---|
| 2,310,907 A | | 2/1943 | Mcmillan |
| 3,094,394 A | * | 6/1963 | Innes .................... F01N 3/2053 |
| | | | 60/299 |
| 3,838,977 A | | 10/1974 | Warren |
| 3,990,858 A | | 11/1976 | O'Sullivan et al. |
| 4,682,470 A | | 7/1987 | Shaff |
| 4,876,072 A | | 10/1989 | Checki |

(Continued)

FOREIGN PATENT DOCUMENTS

| | | |
|---|---|---|
| CA | 2789370 A1 | 10/2012 |
| GB | 1564994 A | 4/1980 |

(Continued)

*Primary Examiner* — Lessanework Seifu
(74) *Attorney, Agent, or Firm* — BakerHostetler

(57) ABSTRACT

A catalyst carrier for insertion into a reactor tube of a tubular reactor that comprises a container containing particles of catalyst. The container further contains a compacting element for reducing fluidisation of the particles of catalyst.

16 Claims, 4 Drawing Sheets

(56)              References Cited

U.S. PATENT DOCUMENTS

| | | | | |
|---|---|---|---|---|
| 5,202,097 | A | * | 4/1993 | Poussin ................. C07C 29/152 |
| | | | | 422/239 |
| 6,296,814 | B1 | | 10/2001 | Bonk |
| 11,731,096 | B2 | | 8/2023 | Guan et al. |
| 2014/0187653 | A1 | | 7/2014 | Gamlin |
| 2017/0232415 | A1 | * | 8/2017 | Gray ..................... B01J 8/0214 |
| | | | | 423/659 |

FOREIGN PATENT DOCUMENTS

| | | |
|---|---|---|
| JP | S53-127014 U | 10/1978 |
| JP | S62-20115 U | 2/1987 |
| JP | 2001-98937 A | 4/2001 |
| JP | 2014-516938 A | 7/2014 |
| WO | 2011/048361 A1 | 4/2011 |
| WO | 2012/146904 A1 | 11/2012 |
| WO | 2016/050520 A1 | 4/2016 |
| WO | 2020/140872 A1 | 7/2020 |

* cited by examiner

COMPACTING ELEMENTS FOR REDUCING FLUIDISATION IN CATALYST CARRIER FOR TUBULAR REACTORS AND ASSOCIATED METHODS

The present disclosure relates to improvements in or relating to catalyst carriers for tubular reactors and associated methods. In particular, the present disclosure relates to a catalyst carrier for insertion into a reactor tube of a tubular reactor and a method of filling a catalyst carrier.

BACKGROUND

Conventional, so-called fixed-bed tubular, reactors comprise a reactor shell containing a plurality of tubes, which are usually cylindrical, and which are usually directly filled with catalyst particles. In use, a heat-transfer medium flows through the shell of the reactor outside these tubes and thereby adjusts the temperature of the catalyst in the tubes by heat exchange across the tube wall. Thus, where the reaction is an exothermic reaction, the heat-transfer medium will allow heat to be removed from the catalyst and where the reaction is an endothermic reaction, the heat-transfer medium will provide heat to the catalyst.

For some reactions, the heat effects of the reaction are moderate such that they are either not problematic or they can be readily managed. In some cases, the heat effects are sufficiently small that large-diameter tubes may be used. This has the benefit that there is a large volume of catalyst within the tube.

However, for more exothermic or endothermic reactions it is necessary that there is efficient heat transfer via the tube wall to the heat-transfer medium to enable the conditions within the reactor to be controlled, in order to maintain a stable operating temperature to avoid detrimental effects occurring. Such effects, for exothermic reactions, may include side reactions taking place, damage to the catalyst such as by sintering of the catalytic active sites, and, in a worst case, thermal runaway. Detrimental effects for endothermic reactions may include quenching of the reaction.

To achieve the desired efficiency, the surface area of the tube wall per unit length has to be maximised. This has in the past been achieved by installing a greater number of smaller-diameter tubes. In some reactions, the size restriction means that the tubes are only of the order of about 15 to 40 mm internal diameter. However, the use of this multiplicity of tubes increases the cost and complexity of the reactor.

Thus, in an attempt to mitigate these problems, an alternative approach has been developed; in particular, for more exothermic or endothermic reactions, in which the catalyst is not directly packed into the reactor tubes but is instead contained in a plurality of catalyst carriers that are configured to sit within the reactor tube.

A first type of such a catalyst carrier is described in WO2011/048361. This arrangement seeks to optimise heat transfer at the tube wall such that larger tubes and larger volumes of smaller catalyst particles can be used, even for more exothermic or endothermic reactions. The catalyst carrier described in WO2011/048361 comprises an annular container for holding catalyst in use. The container has a perforated inner wall defining a tube, a perforated outer wall, a top surface closing the annular container and a bottom surface closing the annular container. The surface closing the bottom of the tube is formed by the inner wall of the annular container. A skirt extends upwards from the perforated outer wall of the annular container from a position at or near the bottom surface of the container to a position below the location of a seal. A seal is located at or near the top surface and extends from the container by a distance which extends beyond an outer surface of the skirt.

A second type of such a catalyst carrier is described in WO2016/050520. In this arrangement, the catalyst carrier comprises a container for holding catalyst in use. The container has a bottom surface closing the container and a top surface. A carrier outer wall extends from the bottom surface to the top surface and a seal extends from the container by a distance which extends beyond the carrier outer wall. The carrier outer wall has apertures located below the seal.

In catalyst carriers filled with particulate catalysts, settling can occur, for example during transportation. Settling can give rise to a void or gap in which catalyst particles may be fluidised in use by gases passing through the catalyst. In some cases, the fluidisation may result in attrition of the catalyst, which can lead to catalyst loss from the container thus exacerbating the potential for fluidisation.

It is an object of the invention to overcome the problem of catalyst fluidisation in catalyst carriers.

SUMMARY OF THE DISCLOSURE

In a first aspect of the present disclosure there is provided a catalyst carrier for insertion into a reactor tube of a tubular reactor, the catalyst carrier comprising a container containing particles of catalyst;

the container further containing a compacting element for reducing fluidisation of the particles of catalyst.

Advantageously, the compacting element reduces fluidisation of the particles of catalyst by applying a compressive force to the particles of catalyst. In this manner the compacting element may reduce the movement of the particles of catalyst within the container during operation. This may, in turn, reduce attrition and erosion of the particles of catalyst. This may beneficially increase the working life of the catalyst and or increase the efficiency of the catalytic reaction using the catalyst.

In some embodiments the compacting element may be a compressible element.

The compressible element may be interposed between the particles of catalyst and a top of the container. In some embodiments the compressible element may be interposed between the particles of catalyst and a lid or closing end of the container. The compressible element may be directly adjacent to the lid or closing end of the container. The compressible element is compressed against the catalyst upon closing of the container.

The compressible element may be attached to the lid or closing end of the container, for example an underside of the lid or closing end. The attachment may be by means of a suitable fixative, for example an adhesive, clips, rivets, etc. Alternatively, the compressible element may be separate from the lid or closing end.

The compressible element may comprise a pad of a compressible material. The compressible element may comprise a thickness of a single pad or may comprise a thickness made up of multiple pads that are assembled together. Multiple pads may be attached together by means of a suitable fixative, for example an adhesive, stitching, staples, etc.

In some embodiments, the compressible element may comprise a ceramic material. The ceramic material may comprise of refractory ceramic fibres, including refractory oxide fibres. In some examples, the ceramic material may comprise alumina fibres, silica fibres, alumino-silicate fibres, titania fibres, zirconia fibres or a mixture of two or more of these. The ceramic material may comprise a non-woven material.

The particles of catalyst may form a catalyst bed and the compacting element may be positioned at a top end of the catalyst bed.

The compressible material may have a bulk density of less than about 400 kg/m³, preferably less than about 200 kg/m³, optionally 100 to 200 kg/m³, optionally 150 to 200 kg/m³. Beneficially it has been found that these lower bulk densities may be particularly effective at reducing fluidisation of the particles of catalyst. In particular, a compressible element with such a bulk density may be less prone to sink down within the bed of catalyst particles during operation. By retaining the compressible element on top of the catalyst bed an improved flow regime within the container may be achieved.

The catalyst bed may comprise a radial-flow bed or an axial-flow bed of catalyst.

In some embodiments, the container may comprise an annular chamber containing the particles of catalyst, the annular chamber having a perforated inner chamber wall defining an inner channel, a perforated outer chamber wall, a top surface closing the annular chamber and a bottom surface closing the annular chamber. Suitable containers are described, for example, in WO2011/048361 and WO2016/050520.

The compacting element may be within the annular chamber on top of the particles of catalyst. The compacting element may comprise an annular element. The compacting element may be configured as an interference fit within the annular chamber.

In some embodiments the compacting element may comprise a tamping element configured to tamp the particles of catalyst. The tamping element may comprise a portion of a lid or closing end of the container. For example, the tamping element may comprise a portion of the lid or closing end that is shaped to project into the container to contact and tamp down the particles of catalyst upon closing. Alternatively, the tamping element may be interposed between a lid or closing end of the container and the particles of catalyst. The tamping element may comprise a rigid, resilient and/or compressive portion. For example, the tamping element may comprise a movable metal plate or gauze formed from a metal, such as steel.

In some embodiments, the compacting element may comprise an intumescent material. An intumescent material may be interposed between a lid or closing end of the container and the particles of catalyst and upon heating expand to fill any void or gap between the catalyst particles and the lid or closing end. The intumescent material may expand sufficiently to fill any void or gap or to provide a compressive force between the lid or closing end and the particles of catalyst. One or more intumescent materials may be included The compressible element or intumescent material desirably does not contain catalyst poisons. Catalyst poisons typically include sulphur compounds, halogen compounds, alkali-metal compounds and heavy metals such as mercury that may interfere with the function of the catalyst in use.

In a second aspect of the present disclosure there is provided a method of filling a catalyst carrier, the method comprising the steps of:

i) filling particles of catalyst into an open container of the catalyst carrier;

ii) providing a compacting element on or in the container; and iii) closing the open container to compact the particles of catalyst using the compacting element and form a closed container of the catalyst carrier.

In step i) the particles of catalyst may form a catalyst bed.

The particles of catalyst may be filled first into the open container, and then the compacting element may be installed into the open container, such that the compacting element is positioned at a top end of the catalyst bed.

The compacting element may comprise a compressible element or a tamping element and closing the open container may compress the compressible element or tamp the tamping element against the particles of catalyst.

In step iii) the open container may be closed by applying a lid or closing end to the catalyst carrier and closing the lid or closing end may compress the compressible element against the particles of catalyst. Alternatively, the compacting element may comprise a tamping element and closing the open container may cause the tamping element to tamp the particles of catalyst to densify the catalyst bed.

Alternatively, the compacting element may comprise an intumescent material.

The present methods and catalyst carriers may usefully be used for a wide range of processes. Examples of suitable uses include processes and reactors for exothermic reactions such as reactions for the production of methanol, reactions for the production of ammonia, methanation reactions, shift reactions, oxidation reactions such as the formation of maleic anhydride and ethylene oxide reactions and the like. A particularly preferred use is in processes and reactors for performing the Fischer-Tropsch reaction.

Endothermic reactions such as pre-reforming, dehydrogenation and the like may also be carried out in conjunction with the present methods and catalyst carriers.

The catalyst carriers of the present disclosure may be filled or partially filled with any catalyst suitable for the intended reaction. For example, a Fischer-Tropsch catalyst may be used for the Fischer-Tropsch reaction. Cobalt-containing Fischer-Tropsch catalysts are preferred. The catalyst may be provided as catalyst particles. The catalyst may be provided as a single bed of catalyst or multiple beds of catalyst. The catalyst carrier may be configured to promote axial and/or radial flow through the catalyst. In some embodiments the catalyst carrier may be configured to preferentially promote radial flow through the catalyst.

The catalyst carrier of the present disclosure may be formed of any suitable material. Such material will generally be selected to withstand the operating conditions of the tubular reactor. The catalyst carrier may be fabricated from carbon steel, aluminium, stainless steel, other alloys or any material able to withstand the reaction conditions.

BRIEF DESCRIPTION OF THE DRAWINGS

Embodiments of the present disclosure will now be described, by way of example only, with reference to the accompanying drawings, in which.

DETAILED DESCRIPTION

Figure 1:
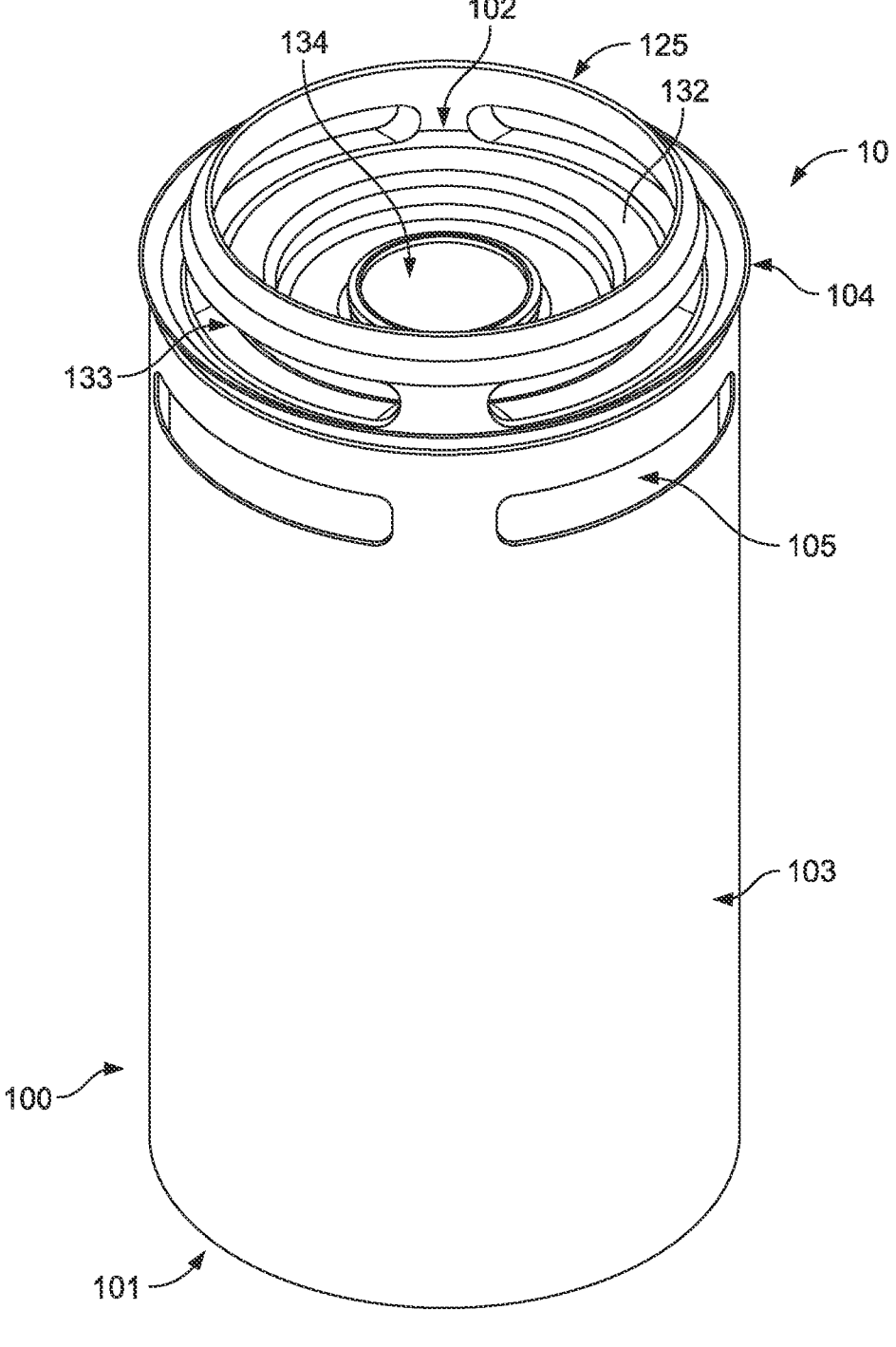
FIG. 1 is a perspective view of a catalyst carrier.

In the following, aspects and embodiments of the present disclosure will be described, by way of example only, with reference to example configurations of catalyst carrier. How-ever, it will be understood that according to the present disclosure the catalyst carriers may take various forms. For example, as well as the examples described herein the catalyst carriers may take other forms including but not limited to those disclosed in WO2011/048361, and WO2016/050520, the contents of which are herein incorporated by reference in their entirety.

Additionally, in this specification, any reference to orientation; for example, terms such as top, bottom, upper, lower, above, below and the like, is used with regard to the orientation of the parts as illustrated in the drawings being referenced but is not to be seen as restrictive on the potential orientation of such parts in actual use. For example, a part described as being orientated vertically may also be orientated horizontally An example of a catalyst carrier 10 according to the present disclosure is shown, by way of example, in FIGS. 1 to 3.

The catalyst carrier 10 may generally comprise a container that is sized such that it is of a smaller dimension than the internal dimension of a reactor tube into which it is to be placed in use. Typically, a seal will be provided that is sized such that it interacts with the inner wall of the reactor tube when the catalyst carrier 10 is in position within the reactor tube. Parameters such as carrier length and diameter may be selected to accommodate different reactions and configurations of reactor tube.

Figure 2:
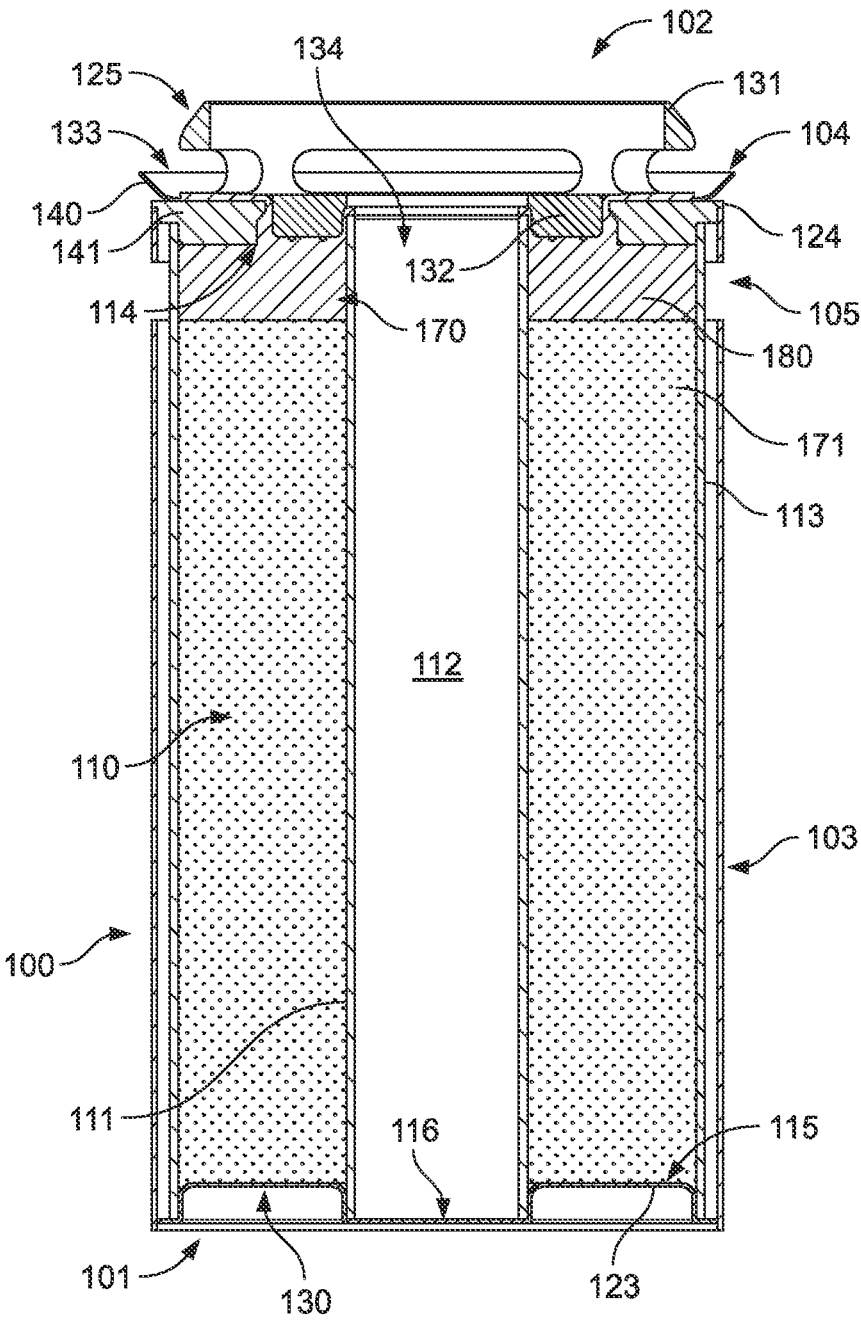
FIG. 2 is a cross-sectional view of the catalyst carrier of FIG. 1.
Figure 3:
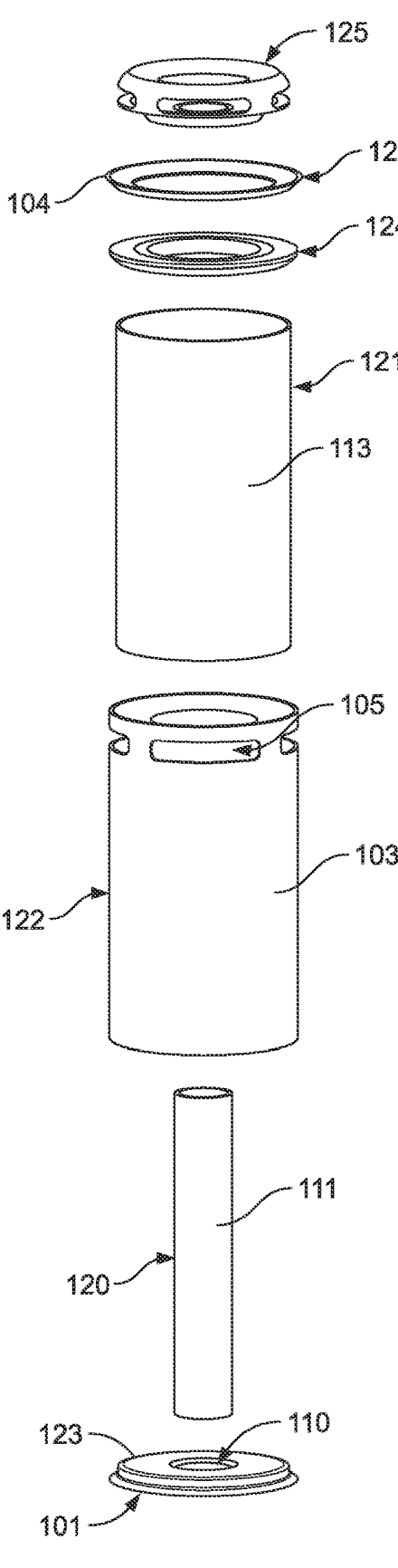
FIG. 3 is an exploded perspective view of the catalyst carrier of FIG. 1.

As shown in FIGS. 1 to 3, the catalyst carrier 10 may comprise a container 100 for holding particles of catalyst in use. The container 100 may generally have a bottom surface 101 that closes a lower end of the container 100 and a top surface 102 at an upper end of the container 100. A carrier outer wall 103 may extend from the bottom surface 101 to the top surface 102. A seal 104 may extend from the container 100 by a distance which extends beyond the carrier outer wall 103. The carrier outer wall 103 may have apertures 105 located below the seal 104.

As shown in FIG. 2, in at least some embodiments the catalyst carrier 10 may more particularly comprise an annular container 110 for holding catalyst in use. The annular container 110 may comprise a perforated inner container wall 111 that defines an inner channel 112 and a perforated outer container wall 113 that may be concentrically arranged about the perforated inner container wall 111. An annular top surface 114 may close an upper end of the annular container 110 and an annular bottom surface 115 may close a lower end of the annular container 110. A lower end of the inner channel 112 may be closed off by a channel end surface 116 except for one or more drain apertures (not shown) that may be provided in the lower end of the inner channel 112. The channel end surface 116 may be formed integrally or separately to the inner container wall 111.

As shown in the exploded view of FIG. 3, the catalyst carrier 10 may be formed from a number of individual components that may be assembled together by any suitable means, including, for example, welding. In some embodiments such components may include a perforated inner tube 120, a perforated intermediate tube 121, an outer tube 122, a bottom cap 123, an annular top ring 124, a top cap 125 and an annular seal ring 126.

The catalyst carrier 10 may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions.

Suitable thicknesses for the components will be of the order of about 0.1 mm to about 1.0 mm, preferably of the order of about 0.3 mm to about 1.0 mm.

The perforated inner tube 120 may comprise the perforated inner container wall 111. The perforated intermediate tube 121 may comprise the perforated outer container wall 113. The outer tube 122 may comprise the carrier outer wall 103 and define the apertures 105. The bottom cap 123 may comprise the bottom surface 101 and or the annular bottom surface 115. The bottom cap 123 may also extend across the perforated inner tube 120 to comprise the channel end surface 116. The annular top ring 124 and the top cap 125 may comprise the annular top surface 114 and may comprise at least part of the top surface 102. The annular seal ring 126 may comprise the seal 104.

The size of the perforations in the perforated inner tube 120 and the perforated intermediate tube 121 will be selected such as to allow uniform flow of reactant(s) and product(s) through the catalyst while maintaining the catalyst within the annular container 110. It will therefore be understood that their size will depend on the size of the catalyst particles being used. In an alternative arrangement, the perforations may be sized such that they are larger but have a filter mesh covering the perforations to ensure catalyst is maintained within the annular container 110.

It will be understood that the perforations may be of any suitable configuration. Indeed, where a wall or tube is described as perforated all that is required is that there is means to allow the reactant(s) and product(s) to pass through the walls or tubes.

The bottom surface 101, for example the bottom cap 123, may be shaped to engage with an upper end of another catalyst carrier 10. For example, the bottom surface 101 may comprise an annular recess 130 around the perforated inner tube 120. The top cap 125 may be shaped to engage in the annular recess 130 of another catalyst carrier 10. For example, the top cap 125 may comprise an annular ring 131 that upstands from an annular plug body 132. The annular ring 131 may be shaped and sized to be received in the annular recess 130.

The bottom surface 101, for example the bottom cap 123 and or channel end surface 116 may include one or more drain holes. Where one or more drain holes are present, they may be covered by a filter mesh.

The annular top ring 124 may be shaped and sized to engage in an upper end of the outer tube 122. The annular plug body 132 of the top cap 125 may have an outer diameter configured to engage with a central aperture of the annular top ring 124. Engagement of the top cap 125 with the annular top ring 124 may function to sandwich and retain the annular seal ring 126 in position.

The top cap 125 may comprise a central inlet 134 in the annular plug body 132 for enabling entry of liquids and gases into the upper end of the inner channel 112. The annular ring 131 may comprise lateral apertures 133 than enable liquids and gases to reach the central inlet 134.

The top cap 125 and annular top ring 124 may together comprise a lid of the catalyst carrier 10 that may be used to close off the upper end of the annular container 110. Alternatively, a lid or closing end formed from a single component may be used.

The carrier outer wall 103 may be smooth or it may be shaped. Suitable shapes include pleats, corrugations, and the like.

The apertures 105 in the carrier outer wall 103 may be of any configuration. In some embodiments, the apertures 105 may be holes or slots.

The seal 104 may be formed in any suitable manner. However, it will generally be sufficiently compressible to accommodate the smallest diameter of the reactor tube. The seal 104 will generally be a flexible, sliding seal. In some embodiments the seal 104 may comprise a deformable flange 140 extending from the carrier outer wall 103 or the top surface 102 of the catalyst carrier 10. The flange 140 may be sized to be larger than the internal diameter of the reactor tube such that as the catalyst carrier 10 is inserted into the reactor tube it is deformed to fit inside and interact with the reactor tube.

In the illustrated example of FIG. 2, the deformable flange 140 comprises an outer portion of the annular seal ring 126. An inner portion 141 of the annular seal ring 126 may define a clamping surface that is sandwiched and retained between the top cap 125 and the annular top ring 124. The deformable flange 140 may be angled relative to the inner portion 141. The deformable flange 140 may be angled towards the upper end of the catalyst carrier 10.

The carrier outer wall 103 may continue above the seal 104. Thus the seal 104 may be located at the top of the catalyst carrier 10, optionally as part of the top surface 102, or it may be located at a suitable point on the carrier outer wall 103 provided that it is located above the apertures 105 in the carrier outer wall 103.

As shown in FIG. 2, by way of example, a compacting element 170 may be provided in the container 100 for reducing fluidisation of the particles of catalyst 171.

Figure 4:
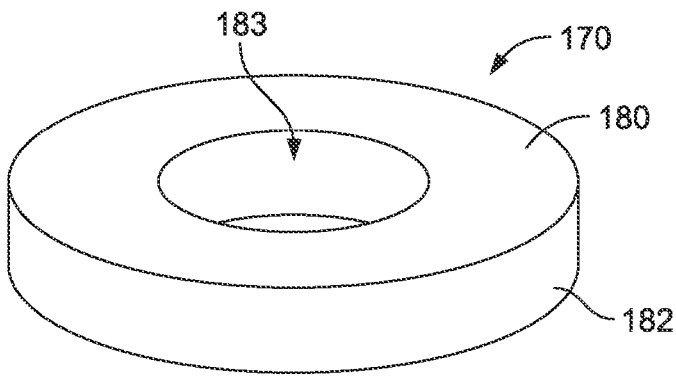
FIG. 4 is a perspective view of a compacting element of the catalyst carrier of FIG. 1.

In the illustrated example of FIGS. 2 and 4, the compacting element 170 comprises a compressible element 180 configured to apply a compressive force to particles of catalyst 171 in the annular channel 110. The compressible element 180 is interposed between the particles of catalyst 171 and a top of the container; in particular, between the particles of catalyst 171 and the top cap 125 and annular top ring 124. Thus, the compressible element 180 may be interposed between the particles of catalyst 171 and a lid or closing end of the container 100.

The particles of catalyst 171 may form a catalyst bed and the compressible element 180 may be positioned at a top end of the catalyst bed. The catalyst bed may comprise a radial-flow bed or an axial-flow bed of catalyst.

The compressible element 180 may comprise a pad 182 of a compressible material as shown, for example, in FIG. 4.

The compressible element 180 may comprise a ceramic material, for example, refractory ceramic fibres including refractory oxide fibres. In some examples the ceramic material comprises alumina fibres, silica fibres, alumino-silicate fibres, titania fibres, zirconia fibres or a mixture of two or more thereof.

The ceramic material may be in the form of a non-woven material.

The compressible material may have a bulk density of less than about 400 kg/m$^3$, preferably less than about 200 kg/m$^3$, optionally 100 to 200 kg/m$^3$, optionally 150 to 200 kg/m$^3$.

The compressible element 180 may be shaped and sized to fit in the container 100, for example in the annular container 110. As shown in FIG. 2, the compressible element 180 may sit within the annular container 110 on top of the particles of catalyst 171.

To facilitate this, the compressible element 180 comprises an annular element having a central aperture 183. The annular element may be sized to fit into the annular container 110 surrounding the inner container wall 111. In some examples the compressible element 180 may be configured as an interference fit within the annular container 110.

In some embodiments, the compacting element 170 may comprise an intumescent material.

In some embodiments, the compacting element 170 may comprise a tamping element 190 configured to tamp the particles of catalyst 171.

Figure 5:
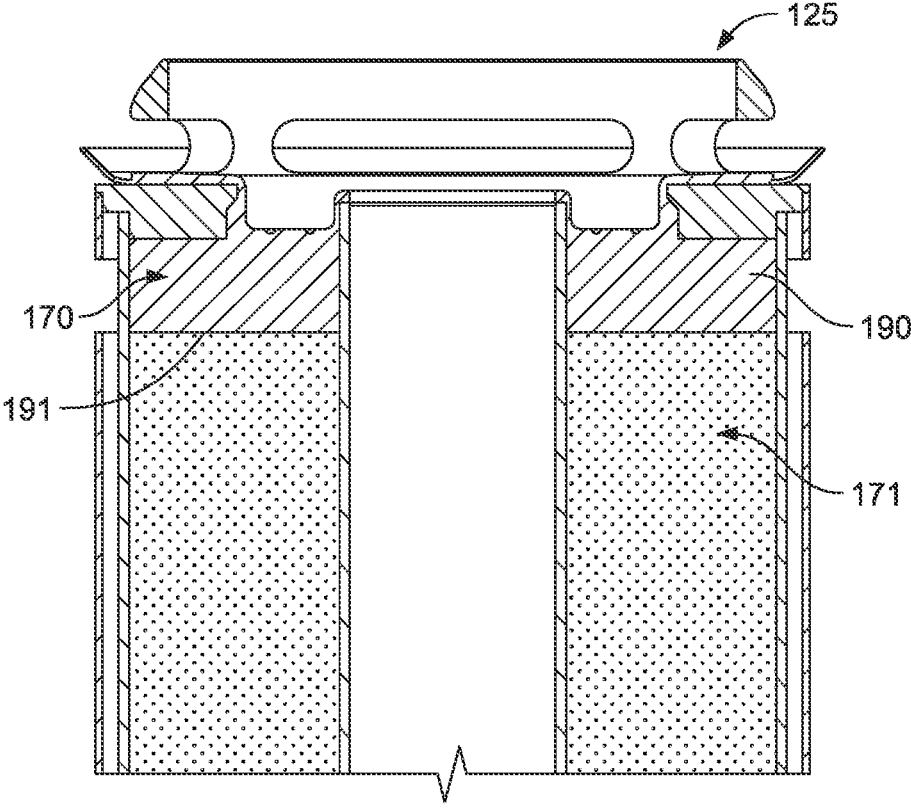
FIG. 5 is cross-sectional view of another catalyst carrier with an alternative compacting element.

As shown in FIG. 5, the tamping element 190 may comprise a portion of a lid or closing end of the container 100. In the illustrated example, the portion may be an annular projection 191 on the underside of the lid or closing end that is shaped to project into the annular container 110 to contact and tamp down the particles of catalyst 171.

With the above embodiments, when the lid or closing end of the container 100 is closed the compacting element 170 (whether a compressible element 180 and or a tamping element 190) acts to compact, compress and or densify the particles of catalyst 171.

The invention claimed is:

1. A catalyst carrier, the catalyst carrier comprising a container containing (i) a radial flow catalyst bed comprising particles of catalyst and (ii) a compacting element that reduces fluidisation of the particles of catalyst, wherein the compacting element comprises a compressible element comprising one or more pads of a compressible material and configured to apply a compressive force to the particles of catalyst, wherein the compressible element is positioned at a top end of the catalyst bed and interposed between the particles of catalyst and a lid or closing end of the container, wherein the compacting element compacts the particles of catalyst when the container is closed; and
   wherein the catalyst carrier is inserted into a reactor tube of a tubular reactor.

2. The catalyst carrier of claim 1, wherein the compressible element comprises a ceramic material.

3. The catalyst carrier of claim 1, wherein the ceramic material comprises refractory ceramic fibres.

4. The catalyst carrier of claim 1, wherein the ceramic material comprises alumina fibres, silica fibres, alumino-silicate fibres, titania fibres, zirconia fibres or a mixture of two or more of these.

5. The catalyst carrier of claim 1, wherein the ceramic material comprises a non-woven material.

6. The catalyst carrier of claim 1, wherein the compressible material has a bulk density of less than about 400 kg/m$^3$.

7. The catalyst carrier of claim 1, wherein the container comprises an annular chamber containing the particles of catalyst, the annular chamber having a perforated inner chamber wall defining an inner channel, a perforated outer chamber wall, a top surface closing the annular chamber and a bottom surface closing the annular chamber;
   and optionally wherein the compacting element is within the annular chamber on top of the particles of catalyst.

8. The catalyst carrier of claim 7, wherein the compacting element comprises an annular element.

9. The catalyst carrier of claim 7, wherein the compacting element is configured as an interference fit within the annular chamber.

10. The catalyst carrier of claim 1, wherein the compacting element comprises a tamping element configured to tamp the particles of catalyst.

11. The catalyst carrier of claim 10, wherein:
    the tamping element comprises a portion of a lid or closing end of the container; or
    wherein the tamping element is interposed between a lid or closing end of the container and the particles of catalyst.

12. The catalyst carrier of claim 10, wherein the tamping element comprises a rigid, resilient and/or compressive portion.

13. The catalyst carrier of claim 1, wherein the compacting element comprises an intumescent material.

14. The catalyst carrier of claim 1, wherein the compressible material has a bulk density of less than about 200 kg/m$^3$.

15. The catalyst carrier of claim 1, wherein the compressible material has a bulk density of 100 to 200 kg/m$^3$.

16. The catalyst carrier of claim 1, wherein the compressible material has a bulk density of 150 to 200 kg/m$^3$.

\* \* \* \* \*